(No Specimens.)
C. NEWTON.
MANUFACTURE OF ENAMELED BRICK.
No. 299,571. Patented June 3, 1884.
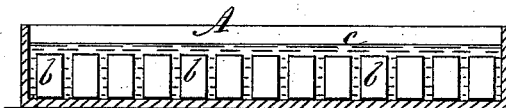
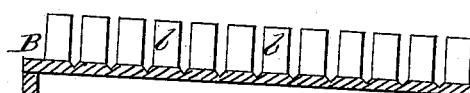
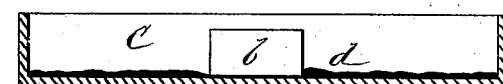
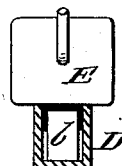
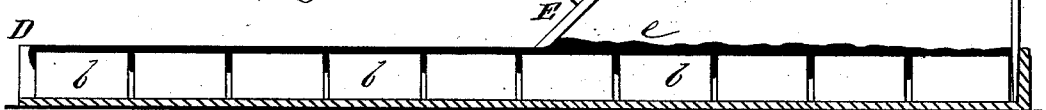
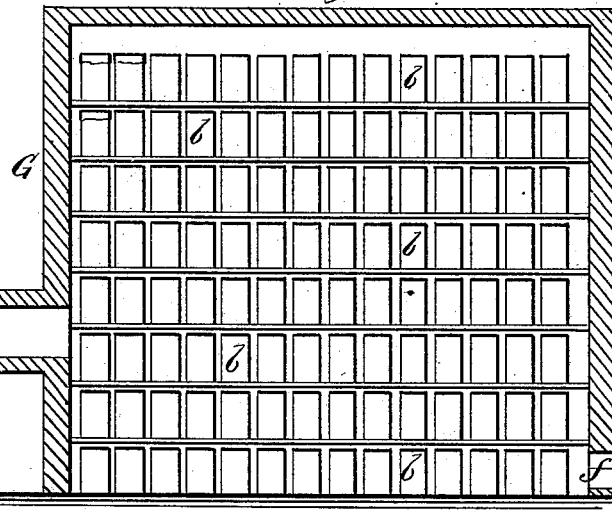
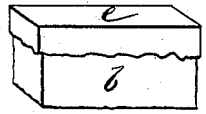
WITNESSES:
C. Neveux
C. Sedgwick
INVENTOR:
C. Newton
BY [signature]
ATTORNEYS.

UNITED STATES PATENT OFFICE.

CHARLES NEWTON, OF COUNCIL BLUFFS, IOWA.

MANUFACTURE OF ENAMELED BRICK.

SPECIFICATION forming part of Letters Patent No. 299,571, dated June 3, 1884.

Application filed November 6, 1883. (No specimens.)

*To all whom it may concern:*

Be it known that I, CHARLES NEWTON, of Council Bluffs, in the county of Pottawattamie and State of Iowa, have invented certain new and useful Improvements in the Manufacture of Enameled Brick, of which the following is a full, clear, and exact description.

This invention has for its object the production in a cheap and simple manner of enameled brick mainly designed for the front bricks of walls, buildings, and other structures, and comprises a novel process of making the same from ordinary or domestic brick by pressing onto or into the face or surfaces of the brick Portland or hydraulic cement of any suitable description, and of different colors, and afterward treating the same substantially as hereinafter described.

Reference is to be had to the accompanying drawings, forming part of this specification, in which similar letters of reference indicate corresponding parts in all the figures.

Figures 1, 2, and 3 are sectional views, in elevation, illustrative of the preliminary stages of the process of making the enameled brick. Figs. 4 and 5 are sectional views, in planes at right angles with each other, explanatory of subsequent stages of said process. Fig. 6 is a sectional view in explanation of an artificial mode of hardening and drying the enameled surface of the brick; Fig. 7, a view of a molded brick in a cementing or enameling mold, and Fig. 8 a perspective view of the enameled brick.

My method of proceeding in making the enameled brick is as follows: I select from a pile of ordinary-made brick good, sound, hard-burned bricks, and after roughly gaging them place said bricks *b* in a wooden or other trough, A, containing water *c*, until the same are thoroughly saturated. I then take the bricks out of the trough A and place them upon an incline, B, or elsewhere, to partly drain them, after which they are transferred, singly or otherwise, to a shallow trough, C, containing Portland or hydraulic cement *d*, mixed to about the consistency of cream, whitewash, or mortar. Each of said bricks *b* is dipped, face edge downward, in said cream-cement, and well rubbed against or over the bottom of the trough till the cement is thoroughly incorporated with or rubbed into the brick. After the bricks have been thus treated, they are put into a wooden or other trough, D, which may be of any convenient length and about one-eighth of an inch wider than the brick is thick, and about one-sixteenth of an inch deeper than the width of the brick. This trough D is square, and open at one of its ends, and a number of the bricks, *b*—say, a dozen, more or less—are put into it, face edge uppermost, when I take pure hydraulic cement *e* of a suitable consistency—of about the consistency of mortar used for plastering—and spread it onto the bricks having already one coat of cream-cement, and finish down by a wooden scraper, E, or otherwise, level with the top of the trough D, and for a smoother finish pass a trowel over the surface. A lever or other suitable appliance may then be inserted in the trough D to move the bricks along the trough toward the open end thereof, when the bricks *b* are taken one by one as they emerge from said end of the trough, and the head ends of as many of them finished off as are required for corners, jambs, &c. As the bricks are thus moved along and out of the trough D, they are seized on the under side by the operator at the open end of the trough and placed on shelves to harden.

For molded bricks, instead of the long troughs described, each brick *b*, as shown in Fig. 7, may be placed in a small trough or mold, F, of the shape required to give a gloss-finish, and be shaken about in the mold with cream-cement on the brick.

As the time required for hardening the enameled brick by simple exposure to the air would ordinarily occupy some days, I propose, where saving of time is an object, to effect the hardening by setting the brick over a stream or streams of carbonic-acid gas—as, for instance, by arranging the bricks with their enameled faces uppermost on tiers of bars within a closed structure, G, connected at its one end near its base with a furnace, H, charged with suitable fuel, and the heated fumes from which will first rise, and the carbonic acid afterward, by its superior density, settle downward on the exposed surfaces of the bricks, the outlet *f* for the draft being at the base of the opposite end of the structure, which may be otherwise constructed than is here described.

To make colored enameled brick, the necessary color should be mixed with the second coating of cement, which is applied to the surface of the brick, as described.

Ordinary domestic-made bricks thus enameled while presenting a fine or ornamental and hard finish will be found much cheaper than "pressed" bricks; also than those of foreign make, which require to be gaged and rubbed after delivery, and in cutting or shaping which for arches, &c., the mechanic works on a high-priced material, making breakages and waste, all of which adds to the cost of the brick, as does also the damage done in shipping and handling said foreign brick.

Not only is the domestic brick cheaper, but it can be supplied more promptly and of any color desired, and in shaping or cutting it for arches, moldings, &c., the mechanic works on common brick before the same is enameled. A less skilled hand, too, can cut and shape a greater quantity of such brick than a skilled mechanic can the foreign brick in the same time, and in cutting or shaping such common brick it is only necessary to chip the same out roughly, inasmuch as the enamel puts on the finish. A very prominent advantage likewise is that the hardest burned brick, even clinkers, can thus be enameled and applied to the face of a wall where they will be of the greatest service. The enameled home-made brick, too, can be closer cut and be as perfect as the best pressed or foreign brick, and in case a wall will not "work" even brick for length or height, said enameled brick can readily be made either a little longer or shorter, or thicker or thinner, so that the joints will be even and fair. Again, as it is well known that bricks in being burned contract to different sizes, it will be practicable, by enameling after burning, to make bricks of uniform length and thickness.

Having thus described my invention, I claim as new and desire to secure by Letters Patent—

1. The within-described process of making enameled brick, which consists in first soaking ordinary brick in water and draining it, next rubbing, under pressure, hydraulic cement of a cream-like consistency onto and into its surface to be enameled, afterward applying a second coating of pure cement, with or without coloring-matter, to said surface and leveling the same; also, where necessary, smoothing or finishing off the head end of the brick, and subsequently drying and hardening the brick, essentially as specified.

2. In the within-described process of making enameled brick by the application of hydraulic cement to its surface, hardening the brick so coated or surfaced by exposing it to the action of carbonic-acid gas, essentially as specified.

3. Brick having its surface or surfaces enameled by rubbing in and applying hydraulic cement thereto, and afterward drying and hardening the same, essentially as described.

CHARLES NEWTON.

Witnesses:
PATRICK H. GUNCKEL,
HOWE PAIGE.